United States Patent [19]

Gassman et al.

[11] Patent Number: 4,928,628

[45] Date of Patent: May 29, 1990

[54] EGG INOCULATION DEVICE AND METHOD OF USING SAME

[75] Inventors: Max P. Gassman; David J. Larson; Darrell W. Trampel, all of Ames, Iowa

[73] Assignee: Iowa State University Research Foundation, Inc., Ames, Iowa

[21] Appl. No.: 205,950

[22] Filed: Jun. 13, 1988

[51] Int. Cl.[5] .............................................. A01K 45/00
[52] U.S. Cl. ...................................................... 119/1
[58] Field of Search ................ 119/1; 211/14; 426/300

[56] References Cited

U.S. PATENT DOCUMENTS

| | | | |
|---|---|---|---|
| 2,851,006 | 9/1958 | Taylor et al. | 119/1 |
| 3,120,834 | 2/1964 | Goldhaft et al. | 119/1 |
| 3,123,045 | 3/1964 | Cosgrove et al. | 119/1 |
| 3,148,649 | 9/1964 | Moore et al. | 119/1 |
| 3,377,989 | 4/1968 | Sandhage et al. | 119/1 |
| 3,758,256 | 9/1973 | Terada | 426/300 X |
| 4,040,388 | 8/1977 | Miller | 119/1 |
| 4,469,047 | 9/1984 | Miller | 119/1 |

Primary Examiner—Robert P. Swiatek
Attorney, Agent, or Firm—Zarley McKee, Thomte, Voorhees & Sease

[57] ABSTRACT

A device is shown for inoculating eggs where the egg is supported from movement, and inoculant fluid is forced at positive pressure into an inoculant chamber abutting one end of the egg, where the fluid is forced through the pores of the shell to the interior of the egg, without causing damage to the shell.

16 Claims, 1 Drawing Sheet

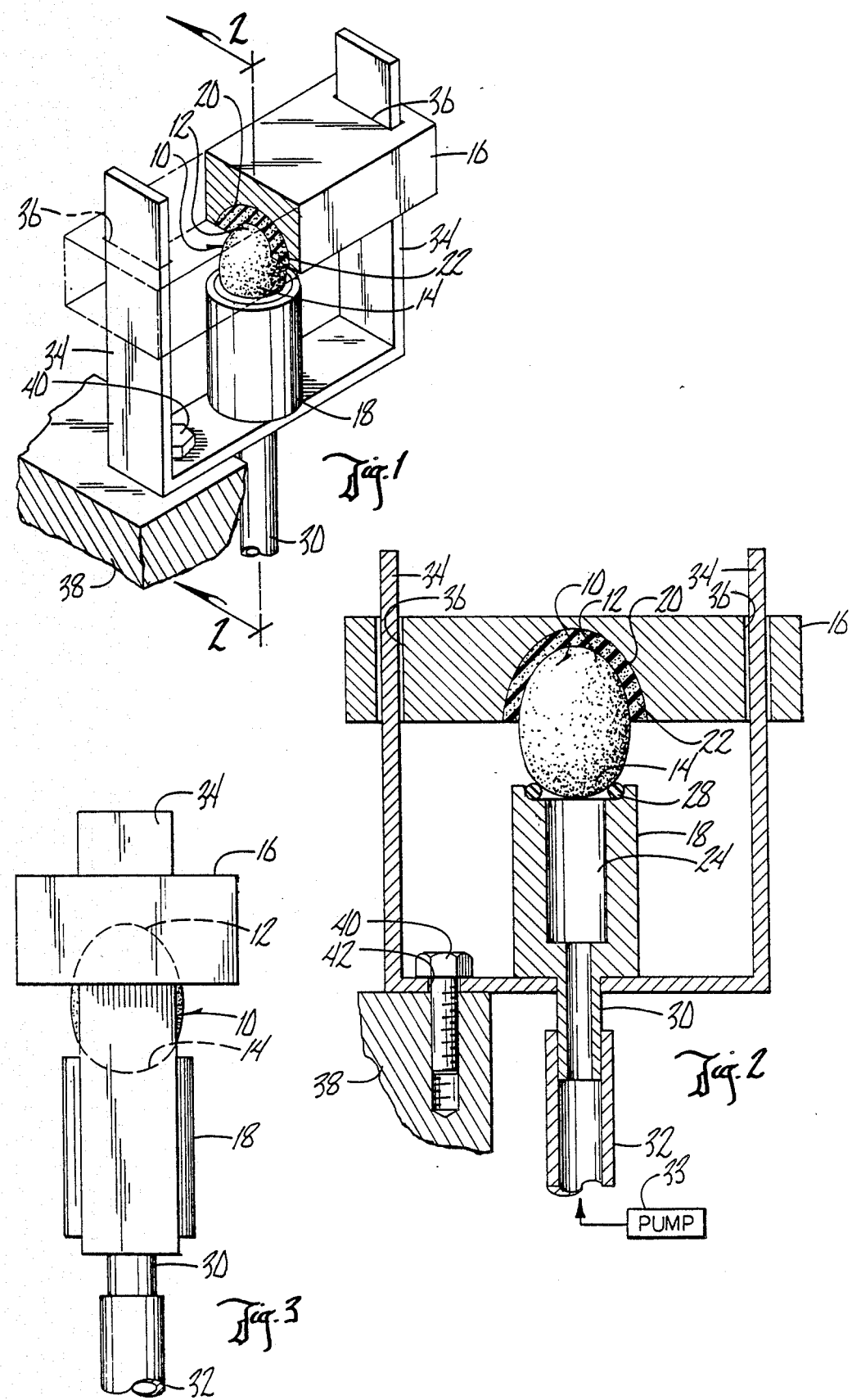

EGG INOCULATION DEVICE AND METHOD OF USING SAME

BACKGROUND OF THE INVENTION

This invention relates to a method to immunize domestic poultry against infectious diseases. Specifically, it relates to the inoculation of an egg with vaccines, vitamins, or other soluble materials, prior to the chicken being exposed to diseases, and to improve development at the earliest possible time.

Young chicks and poults are exposed to disease-causing agents on the first day after hatching when they enter the brooder house. Vaccination during the incubation period would allow the birds to develop partial or total immunity to infectious microorganisms prior to exposure. Birds could develop immunity at an earlier age and suffer fewer death losses in the brooder house. Currently, birds are usually vaccinated after hatching by water or aerosolization. Most of the immunizing products are first applied to birds that are several days of age and then repeated periodically. In recent years, vaccines against respiratory viruses have been aerosolized and used in older birds. Eye drop vaccination is employed to protect birds one week of age or older against infectious laryngotracheitis. The problems that exist with these methods are that such vaccination does not ensure that each bird is exposed, nor does it allow the poultry producer to control the exact dose that each bird receives.

Further, the earlier the vaccination, the less likelihood that there will be loss of poultry to infectious diseases. A major problem associated with the current poultry vaccination procedures is that baby birds are exposed to field viruses, and bacteria before they have the opportunity to develop immunity. Almost without exception, a full week is required to develop a protective level of antibodies after a bird has been vaccinated. Even if birds are immunized on the first day after hatching, they are still susceptible to an infectious disease during the first seven days of life. Birds surviving an infection at such an early age frequently have impaired productivity for the remainder of their life. If chickens possessed immunity when they emerged from the egg, they would be much more resistant to disease at an early age.

Attempts have been made to immunize chick embryos, but the major difficulty involves transporting the vaccine material through the egg shell. One method which has been attempted to deliver material such as antibiotics and vaccines through the egg shell is to place warm, incubating eggs in a cold antibiotic solution. The material in the egg contracts upon contact with the cold solution, thus creating a vacuum inside the egg which causes the antibiotic fluid to pass through the pores of the egg shell to the embryo. The problem with this method is that, when done on a large scale, the antibiotic fluid becomes contaminated by microbes that are not susceptible to the antibiotic. When these microbes are pathogenic, they can infect and kill the embryos.

Another method to get the material to the embryo is to pass a needle through the shell to the embryo and inject the substance. Unfortunately, the trauma of the needle injection often kills the embryo. Also, there is a relatively large hole in the shell after the needle is withdrawn. Microbes from the environment can easily enter such a large opening in the shell.

Improvement upon the prior art provides for a method of inoculation which forces the soluble material through the pores in the shell, without damage to the shell or the chick embryo. This invention relates to an apparatus and method of using the same which incorporates this new method of inoculation.

SUMMARY OF THE INVENTION

This invention relates to inoculation of an egg by removal of the cuticle of the egg, in order to expose the pores, and exposing the shell with removed cuticle to the soluble material at a pressure adequate to penetrate through the pores of the shell to the interior of the egg, without causing damage to the shell.

Accordingly, it is an object of this invention to provide for inoculation of poultry at the earliest possible stage of growth.

It is another object of this invention to provide for inoculation of an egg which does not cause trauma to the shell, or to the embryo.

Another object of the invention is to provide a device for penetrating the shell of an egg with vaccines, vitamins, or other soluble material.

Yet another object of the invention is to provide a device for inoculation which assures that a specific amount of the soluble material is provided to each bird.

Still another object of the invention is to use air pressure to force the soluble material through the pores of the egg shell.

A further object is to provide a device which allows for a minimal amount of movement or trauma to the egg.

Another object is to provide for a device which minimizes the possibility of breakage of the egg.

BRIEF DESCRIPTION OF THE FIGURES OF THE DRAWINGS

FIG. 1 is a top plan view of one embodiment of the invention.

FIG. 2 is a front cross-sectional view taken along lines 2—2 of FIG. 1.

FIG. 3 is a partial side view of the invention.

DETAILED DESCRIPTION OF THE PREFERRED EMBODIMENT

The egg to be inoculated is shown at 10 in FIGS. 1 through 3. The egg has a small end 12 and a large end 14, and as can be best seen in FIG. 2, in this preferred embodiment of the invention, the large end 14 is placed toward the inoculant, since it is this end of the egg which ordinarily has more pores. The cuticle will have been removed from at least part of the egg and in this embodiment is removed from the large end of the egg to expose the pores. The egg is placed between the upper support means 16 and a transport means 18, which also functions to support the egg. The transport means 18 is designed both to support the egg from movement during inoculation, as well as provide a means to transport the inoculant at sufficient pressure to large end 14 of the egg 10. Upper support means 16 includes within its center a curved portion 20 of a size and shape to accommodate small end 12 of egg 10. To aid in preventing movement of the egg 10 during inoculation, and also to help prevent breakage, a cushion 22 is provided within the curved portion 20, and in this case is a piece of foam rubber, thereby accommodating small end 12 of egg 10.

Transport means 18 is comprised in this embodiment of a plastic block of material in the shape of a cylinder, and which includes within a hollow center which forms the inoculant chamber 24. Of course, transport means 18 may take any convenient shape or form. A variety of materials could also be used to accomplish the aims of the invention. Transport means 18 abuts large end 14 of the egg 10 at the open end of the inoculant chamber 24. A sealing means, in this embodiment an O-ring 28, is provided at the open end of transport means 18 and assists in both supporting the egg and in sealing the inoculant chamber 24 so that the inoculant fluid will not escape during pressurization. The other end of the transport means 18 includes a smaller diameter portion 30, which is of a diameter that may snugly fit within a hose 32. The hose 32 is then connected to a pressure means which in this embodiment of the invention is a pump 33, which forces the inoculant fluid through the hose, into the smaller diameter portion 30, into inoculant chamber 24, and eventually to large end 14 of the egg 10. The pressure means may take any recognized form, such as a hand pump, electrical pump, or gravity head. The pressure means supplies the inoculant to the egg surface at a pressure of about 2 to 5 pounds per square inch.

Guides 34 are shown as one means of stabilizing upper support means 16. These two L-shaped guides 34 are placed on either side of the smaller diameter portion 30 and slidably pass through holes 36 within upper support means 16. The weight of support means 16 holds the egg against movement. The entire device may then be secured to a support 38, such as a table, by means of a bolt 40 passing through an aperture 42, in one of the L-shaped guides 34.

In this manner, gravity keeps the upper support means 16 cushioned in place against the smaller portion 12 of the egg 10. The large end 14 of the egg 10 is supported by the transport means 18 and O-ring 28, which also seals off the inoculant chamber 24. Pressure means, well pump 33, is then employed to force the inoculant fluid into the hose 32, on into smaller diameter portion 30, to the inoculant chamber 24, and through the pores at larger end 14 of egg 10.

It is to be understood that this is just one embodiment of the invention, which may take a variety of shapes and still fall within the scope of this invention.

It can be seen that the invention accomplishes at least all of its objectives.

We claim:

1. An apparatus for inoculating soluble materials into an egg having a shell, a smaller end and a larger end, comprising:
   a support means for holding said egg against movement;
   means for supplying said soluble materials to the surface of said egg at positive pore-penetrating pressure including a transport means having two open ends and a hollow center for carrying said soluble materials to said egg, one of said ends of said transport means abutting one of said ends of said egg.

2. The apparatus of claim 1 wherein said transport means also supports one end of said egg.

3. The apparatus of claim 1 wherein said transport means supports said larger end of said egg.

4. The apparatus of claim 1 further comprising pressure means for supplying said soluble materials to said hollow center of said transport means and to one of said ends of said egg at a pore-penetrating pressure so that said materials penetrate into said egg while allowing said shell to remain intact.

5. The apparatus of claim 4 wherein said pressure means supplies said soluble materials to the surface of said egg at approximately 2 ppsi to 5 ppsi.

6. The apparatus of claim 5 wherein said pressure means supplies said soluble materials to the surface of said egg at approximately 5 ppsi.

7. The apparatus of claim 4 wherein said pressure means is a pump.

8. The apparatus of claim 7 wherein said pump forces said materials into a hose connected to said transport means.

9. The apparatus of claim 8 wherein said transport means is a hollow plastic cylinder.

10. The apparatus of claim 9 wherein said sealing means is an O-ring of a size and shape to accommodate one of said ends of said egg while also sealing one of said ends of saids transport means.

11. The apparatus of claim 1 further comprising a sealing means on the end of said transport means which abuts one end of said egg; said sealing means preventing said soluble materials from escaping from said transport means.

12. The method of inoculating an egg having an enclosed shell with at least a portion of the cuticle removed from the shell comprising,
    holding the egg against movement,
    placing a fluid inoculation means against the shell of the egg when the cuticle is removed,
    sealing said fluid inoculation means to said shell to prevent the leakage of fluid from said fluid inoculation means to the exterior of said egg,
    supplying inoculation fluid to said fluid inoculation means under sufficient pressure to cause said inoculation fluid to penetrate the pores of said shell within the confines of the connection between said egg and said fluid inoculation means, whereby the fluid inoculation means enters the interior of said shell.

13. The method of claim 12 wherein said egg is confined by exerting pressure against said shell in a direction and at least a position substantially opposite to said position of said fluid inoculation means.

14. The method of claim 12 wherein said inoculant fluid is supplied to said fluid inoculation means at a pressure of approximately two pounds per square inch to five pounds per square inch.

15. The method of claim 12 wherein said pressure is supplied by a pump.

16. The method of claim 12 wherein an O-ring is provided to seal and support said egg where said cuticle has been removed.

* * * * *